(12) United States Patent
Fecteau et al.

(10) Patent No.: US 7,811,447 B2
(45) Date of Patent: Oct. 12, 2010

(54) METHOD OF TRANSFERRING PARTICLES FROM ONE PRESSURE ZONE TO ANOTHER PRESSURE ZONE

(75) Inventors: David J. Fecteau, Dhahan (SA); Christopher Naunheimer, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 323 days.

(21) Appl. No.: 11/832,059

(22) Filed: Aug. 1, 2007

(65) Prior Publication Data

US 2009/0032440 A1 Feb. 5, 2009

(51) Int. Cl.
*B01J 8/12* (2006.01)
(52) U.S. Cl. ........................ 208/173; 208/176
(58) Field of Classification Search ............ 208/165, 208/169, 173–176, 110–149
See application file for complete search history.

(56) References Cited

U.S. PATENT DOCUMENTS

| | | | |
|---|---|---|---|
| 2,758,063 A | 8/1956 | MacLaren et al. | |
| 3,547,809 A | 12/1970 | Ehrlich et al. | |
| 3,647,680 A | 3/1972 | Greenwood et al. | |
| 3,652,231 A | 3/1972 | Greenwood et al. | |
| 3,658,691 A | 4/1972 | Keith et al. | |
| 3,692,496 A | 9/1972 | Greenwood et al. | |
| 3,725,248 A | 4/1973 | Greenwood et al. | |
| 3,725,249 A | 4/1973 | Vesely et al. | |
| 3,825,116 A | 7/1974 | Greenwood | |
| 3,838,038 A | 9/1974 | Greenwood et al. | |
| 3,839,196 A | 10/1974 | Plackmann et al. | |
| 3,839,197 A | 10/1974 | Greenwood et al. | |
| 3,854,887 A | 12/1974 | Heinze et al. | |
| 3,864,240 A | 2/1975 | Stone | |
| 3,896,026 A | 7/1975 | MacLean et al. | |
| 3,992,465 A | 11/1976 | Juguin et al. | |
| 4,048,057 A | 9/1977 | Murphy | |
| 4,133,743 A | 1/1979 | Boret et al. | |
| 4,167,473 A | 9/1979 | Sikonia | |
| 4,167,474 A | 9/1979 | Sikonia | |
| 4,172,027 A | 10/1979 | Ham et al. | |

(Continued)

FOREIGN PATENT DOCUMENTS

EP 0289991 11/1988

(Continued)

OTHER PUBLICATIONS

Edgar, T.F. et al. (1997). "Process Control" in Perry's Chemical Engineers' Handbook, 7th ed., McGraw-Hill, 84 pgs.*

(Continued)

*Primary Examiner*—Robert J Hill, Jr.
*Assistant Examiner*—Brian McCaig
(74) *Attorney, Agent, or Firm*—Maryann Maas

(57) ABSTRACT

One exemplary embodiment can include a method of controlling a catalyst transfer vessel cycle of loading and unloading based on an expected level of a catalyst in a downstream vessel for a hydrocarbon conversion unit. The method can include calculating an expected catalyst level in the downstream vessel based on the unloading of the catalyst transfer vessel to adjust a setpoint to change the catalyst transfer vessel cycle of loading and unloading.

19 Claims, 2 Drawing Sheets

U.S. PATENT DOCUMENTS

| | | | |
|---|---|---|---|
| 4,210,519 A | 7/1980 | Boret et al. | |
| 4,218,338 A | 8/1980 | Huin et al. | |
| 4,233,268 A | 11/1980 | Boret et al. | |
| 4,341,740 A | 7/1982 | Greenwood | |
| 4,345,993 A * | 8/1982 | Stewart | 208/164 |
| 4,409,095 A | 10/1983 | Peters | |
| 4,425,222 A | 1/1984 | Swan | |
| 4,498,973 A | 2/1985 | Sikonia et al. | |
| 4,576,712 A | 3/1986 | Greenwood | |
| 4,578,370 A | 3/1986 | Greenwood | |
| 4,615,792 A | 10/1986 | Greenwood | |
| 4,644,089 A | 2/1987 | Lee | |
| 4,720,473 A | 1/1988 | Welch et al. | |
| 4,737,262 A | 4/1988 | Franck et al. | |
| 4,737,269 A | 4/1988 | Bischoff | |
| 4,744,887 A | 5/1988 | Van Driesen et al. | |
| 4,835,129 A | 5/1989 | Travers et al. | |
| 4,872,969 A | 10/1989 | Sechrist | |
| 4,981,575 A | 1/1991 | De Bonneville | |
| 5,034,117 A | 7/1991 | De Bonneville et al. | |
| 5,155,075 A | 10/1992 | Innes et al. | |
| 5,190,638 A | 3/1993 | Swan, III et al. | |
| 5,196,110 A | 3/1993 | Swart et al. | |
| 5,209,840 A | 5/1993 | Sherwood, Jr. et al. | |
| 5,211,838 A | 5/1993 | Staubs et al. | |
| 5,221,463 A | 6/1993 | Kamienski et al. | |
| 5,277,880 A | 1/1994 | Sechrist et al. | |
| 5,338,440 A | 8/1994 | Sechrist et al. | |
| 5,354,451 A | 10/1994 | Goldstein et al. | |
| 5,417,843 A | 5/1995 | Swart et al. | |
| 5,824,619 A | 10/1998 | Sechrist et al. | |
| 5,858,210 A * | 1/1999 | Richardson | 208/173 |
| 6,034,018 A | 3/2000 | Sechrist et al. | |
| 6,395,664 B1 | 5/2002 | Boehner et al. | |
| 6,458,266 B1 | 10/2002 | Lin et al. | |
| 6,472,577 B1 | 10/2002 | Zimmermann et al. | |
| 6,777,585 B2 | 8/2004 | Van Egmond | |
| 6,881,391 B1 | 4/2005 | Sechrist | |
| 6,884,400 B1 | 4/2005 | Austin et al. | |
| 6,945,409 B2 | 9/2005 | Poussin | |
| 2002/0164278 A1 | 11/2002 | Vetter et al. | |
| 2003/0178347 A1 | 9/2003 | Poussin | |
| 2004/0178119 A1 | 9/2004 | Sanchez et al. | |
| 2004/0232083 A1 | 11/2004 | Van Egmond | |
| 2005/0067326 A1 | 3/2005 | Vaughn et al. | |

FOREIGN PATENT DOCUMENTS

| | | |
|---|---|---|
| EP | 0312344 | 4/1989 |
| WO | WO-94/02246 | 2/1994 |
| WO | WO-03/000399 | 1/2003 |
| WO | WO-2005/026294 | 3/2005 |

OTHER PUBLICATIONS

Cha et al., New Flexible Design For IFP High Severity Reforming Technology, May 1973, pp. 138-145, Publisher: Proceedings 38th Midyear Meeting of American Petroleum Institutes Division of Refining.

Smithwick et al., N2 Sweep Speeds Reformer Start-up After Regeneration, Nov. 25, 1985, pp. 104-105, vol. 83, No. 47, Publisher: Oil and Gas Journal.

* cited by examiner

METHOD OF TRANSFERRING PARTICLES FROM ONE PRESSURE ZONE TO ANOTHER PRESSURE ZONE

CROSS-REFERENCE TO RELATED APPLICATION

This application relates to HYDROCARBON CONVERSION UNIT INCLUDING A REACTION ZONE RECEIVING TRANSFERRED CATALYST, filed Aug. 1, 2007, and assigned U.S. Ser. No. 11/832,008, which is hereby incorporated by reference in its entirety.

FIELD OF THE INVENTION

The field of this invention generally relates to a method of transferring particles from one pressure zone to another.

BACKGROUND OF THE INVENTION

There are many chemical processes where solid particulates, such as catalyst, and a hydrocarbon gas are contacted. Frequently, chemical reactions and physical phenomena occur for a predetermined period of time in a reaction zone, contained in, e.g., a moving or fixed bed reactor. Often, the gas/solid contacting is in a continuous or semi-continuous manner (hereinafter may be collectively referred to as "continuous") instead of a batch operation. In such an instance, catalyst particles may be introduced and withdrawn from the reactor, which can be at a higher pressure than the source of the catalyst particles, such as a regenerator.

Hydrocarbon conversion units can include a reactor with one or more moving bed reaction zones used in conjunction with a regenerator. The reactor can include several reactor zones and can be structured in the form of a stack, or be split into sections. Typically, the regenerator with an atmosphere containing oxygen operates at a lower pressure than the reactor with an atmosphere containing hydrogen. Once the catalyst is transferred from the lower pressure to the higher pressure, a lift may be used to transfer the regenerated catalyst to the reactor. After the catalyst is spent, another lift can be utilized to transfer the catalyst from the reactor to the regenerator. Generally, the separation of the atmospheres of the reactor and regenerator is wanted to prevent undesirable side reactions.

Several devices can be used to transfer catalyst from a lower pressure zone to a higher pressure zone. One option may be a transfer vessel having double block-and-bleed ball valves to control the entry of regenerated catalyst into and out of the vessel. The catalyst entering the vessel can be purged with nitrogen to remove oxygen, and pressured with hydrogen up to the reactor pressure before transfer into the reactor. After catalyst exits the vessel, the vessel can be purged with nitrogen to remove the hydrogen before filling again with catalyst. Such a transfer vessel can separate the hydrogen atmosphere of the reactor from the oxygen atmosphere of the regenerator.

Another transfer vessel can be a valveless lock hopper, such as disclosed in U.S. Pat. No. 4,576,712 (Greenwood) or U.S. Pat. No. 4,872,969 (Sechrist), that can include three sections. Generally, catalyst is received in a top section where it is intermittently transferred to a middle section. The middle section can allow catalyst to flow in before being transferred to the bottom section. A standpipe's diameter may be sized in the middle section so that gas flowing upwards can stop catalyst flow, while allowing catalyst flow through another section of the pipe. This may be achieved by the alternate opening and closing of equalizing valves positioned on a pipe communicating with all three sections and in a parallel relationship with the catalyst flow. As an example, when the equalizing valve between the top and middle section is open, the equalizing valve between the middle and bottom section is closed so gas flowing up the lower standpipe will prevent catalyst flow from the middle zone through the lower standpipe, yet allow catalyst flow into the middle zone through the upper standpipe. Repeated cycling of the equalizing valves will allow a controlled flow of catalyst from the low pressure of the regenerator to the high pressure of the reactor.

Introducing catalyst particles into a high-pressure reactor from a regenerator can pose difficulties. Generally, it is beneficial to maintain a continuous flow of catalyst to and from the reactor and regenerator to facilitate conversion of a hydrocarbon stream and cap thermal cycling of the regenerator screen. Typically, a surge capacity is provided before and after the catalyst transfer vessel, which can pass catalyst from one pressure zone to another in batches. Before the transfer vessel, a vessel can be provided to receive a continuous flow of catalyst from the regeneration vessel, and after the transfer vessel, a vessel can be provided for permitting a continuous flow of catalyst to a lift communicating with a reaction vessel. Often, the cycling of the transfer vessel is controlled by the level of catalyst in that vessel. However, such a control can lead to intermittent catalyst flow that can have a negative effect on the operation of the reactor and/or regenerator.

Consequently, there is desire to control the cycling of a catalyst transfer vessel to ensure the consistent flow of catalyst to and from the reactor and regenerator.

BRIEF SUMMARY OF THE INVENTION

One exemplary embodiment can include a method of controlling a catalyst transfer vessel cycle of loading and unloading based on an expected level of a catalyst in a downstream vessel for a hydrocarbon conversion unit. The method can include calculating an expected catalyst level in the downstream vessel based on the unloading of the catalyst transfer vessel to adjust a setpoint to change the catalyst transfer vessel cycle of loading and unloading.

Another exemplary embodiment can include a method of controlling a catalyst transfer vessel cycle of loading and unloading based on an expected level of a catalyst in a downstream vessel for a hydrocarbon conversion unit. The method can include:

a) determining a catalyst circulation rate in the hydrocarbon conversion unit;

b) calculating an expected cycle time of the catalyst in the hydrocarbon conversion unit based on the catalyst circulation rate;

c) calculating a start time and a stop time of unloading the catalyst from the catalyst transfer vessel based on the catalyst circulation rate and a fill volume of the catalyst transfer vessel;

d) calculating a time length for unloading the catalyst transfer vessel based on the start and stop times of unloading;

e) comparing the time for unloading with an actual level of catalyst in the downstream vessel;

f) calculating the expected catalyst level in the downstream vessel based on the actual catalyst level in the downstream vessel, an expected time of delivery and an amount of catalyst from the catalyst transfer vessel, and a rate of catalyst exiting the downstream vessel; and g) adjusting a setpoint for the catalyst circulation rate based on the expected catalyst level of the downstream vessel.

A further embodiment may include a hydrocarbon conversion unit. The hydrocarbon conversion unit can include:
a) an apparatus for transferring one or more particulate solids. The apparatus can include:
  i) a transfer vessel for transferring particulate solids from a zone at a first pressure to a zone at a second pressure;
  ii) a downstream vessel receiving the one or more particulate solids; and
  iii) a level indicator controller communicating with the downstream vessel and the transfer vessel. The level indicator controller can measure the level of particulate solids in the downstream vessel for adjusting a setpoint for transferring particulate solids from the transfer vessel.

Typically, the exemplary control scheme as described herein permits greater control of catalyst flow through the reactor and regenerator and prevents the inconsistent flow of catalyst.

DEFINITIONS

Figure 1:
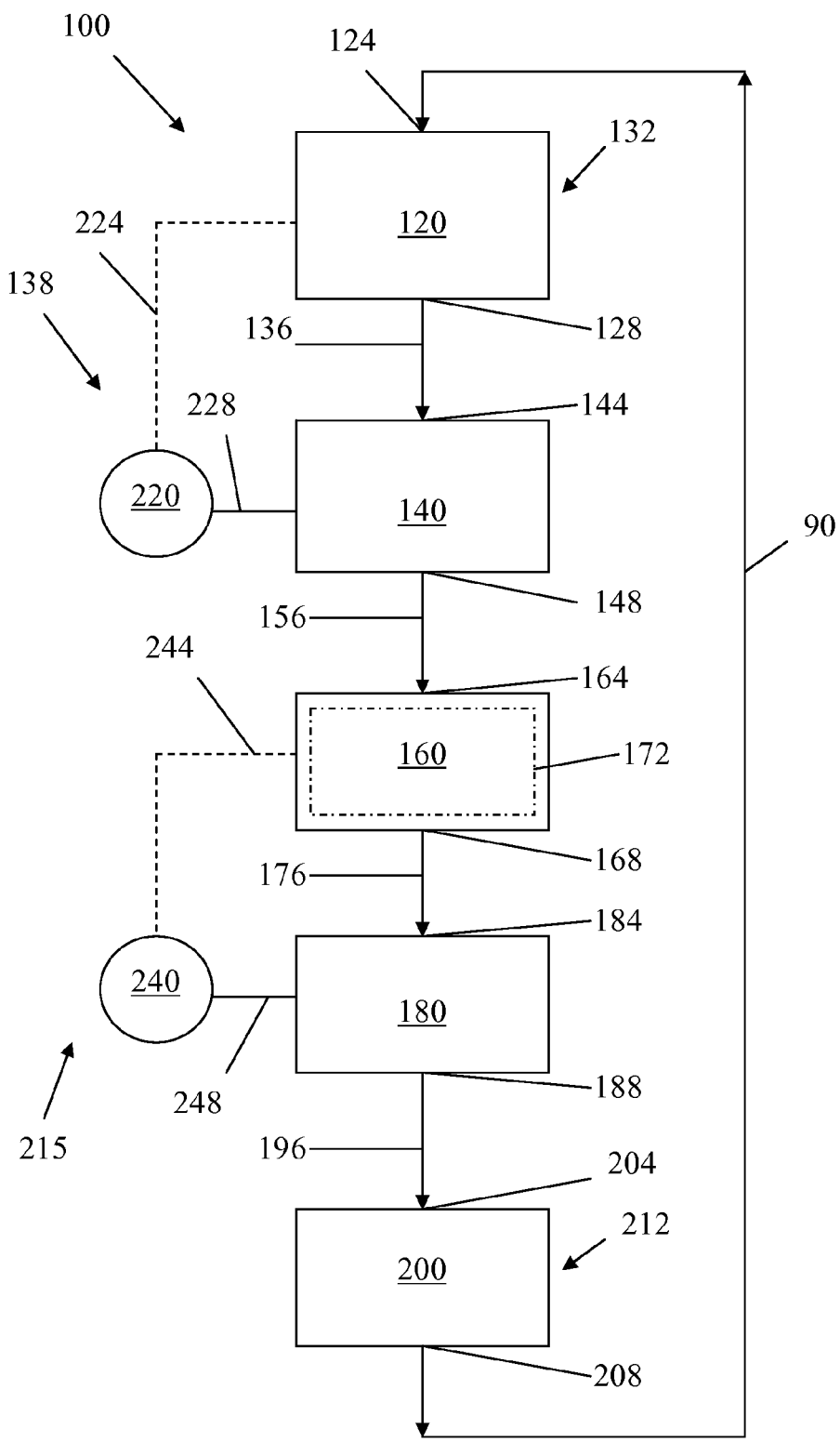
FIG. 1 is a schematic depiction of an exemplary hydrocarbon conversion unit.

As used herein, "gravity-assisted transfer" can mean vessels aligned sufficiently vertical to allow catalyst to flow, at least in part, by gravity from at least one vessel at a higher elevation to at least one vessel at a lower elevation.

As used herein, the term "zone" can refer to an area including one or more equipment items and/or one or more sub-zones. Additionally, an equipment item, such as a reactor or vessel, can further include one or more zones or sub-zones.

As used herein, the term "regenerated", such as regenerated catalyst, can refer to catalyst that has passed through a regenerator, although additional regeneration processes may still be conducted, such as reduction.

DETAILED DESCRIPTION OF THE INVENTION

The embodiments disclosed hereinafter can be used in a multitude of units to transfer particles, such as catalyst, between any two zones which contain fluids that are preferably prevented from communicating. One such application that may require inhibited communication between the fluids of two zones is the transfer of catalyst between a hydrogen-containing reaction zone and an oxygen-containing regeneration zone. Typically these zones are at different pressures, usually with the reaction zone at a higher pressure than the regeneration zone. Generally, inhibiting communication is preferred because the fluids of the two zones can react with each other creating undesirable side reactions. Exemplary reaction and regeneration zones are disclosed in, e.g., U.S. Pat. No. 6,881,391 B1 (Sechrist) and U.S. Pat. No. 6,034,018 (Sechrist et al.)

Such systems having a hydrogen-containing reaction zone and an oxygen-containing regeneration zone may be employed in a wide variety of hydrocarbon conversion reactions including catalytic reforming, alkylation, hydrorefining, hydrocracking, dehydrogenation, hydrogenation, hydrotreating, isomerization, dehydroisomerization, dehydrocyclization, and steam reforming. Generally, the catalysts in these processes are used in one or more hydrocarbon-containing reaction zones in an atmosphere containing hydrogen. Over time, the catalyst in the reaction zone(s) can become deactivated because of the accumulation of coke deposits. Regeneration of the catalyst to remove the coke deposits can help restore the activity of the catalyst. Generally, coke deposits are removed from the catalyst by contacting the catalyst with an oxygen-containing gas to combust and remove the coke in a regeneration zone. Many of these processes use a reaction zone and a regeneration zone in a side-by-side relation to each other. In these systems, the catalyst is continuously removed from the reaction zone and transferred to the regeneration zone for coke removal. Following coke removal, the catalyst can be removed from the regeneration zone and transferred back to the reaction zone. Therefore, there is a requirement to transfer the catalyst back-and-forth between a hydrogen-containing zone and an oxygen-containing zone without substantial communication or cross-mixing of the atmospheres of the two zones.

One widely practiced hydrocarbon conversion process is catalytic reforming utilizing particles of catalyst. Therefore the discussion hereinafter will be in reference to this process, although the embodiments discussed herein are applicable to other processes.

Typically in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 80° C. (about 180° F.) and an end boiling point of about 205° C. (about 400° F.). The reactor inlet temperatures can range from about 450-about 560° C. (about 840-about 1040° F.). The catalytic reforming process can be particularly applicable to the treatment of straight run gasolines comprised of relatively large concentrations of naphthenic and substantially straight chain paraffinic hydrocarbons, which can be subject to aromatization through dehydrogenation and/or cyclization reactions.

Reforming may be defined as the dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. No. 4,409,095 (Peters).

A catalytic reforming reaction is normally effected in the presence of catalyst particles comprised of one or more Group VIII noble metals (e.g., platinum, iridium, rhodium, and palladium) and a halogen combined with a porous carrier, such as an alumina. The particles are usually spheroidal and have a diameter of from about $\frac{1}{16}$th to about $\frac{1}{8}$th inch (about 1.6-about 3.2 mm), although they may be as large as about $\frac{1}{4}$th inch (about 6.4 mm). Exemplary catalysts are disclosed in U.S. Pat. No. 6,034,018 (Sechrist et al.). During the course of a reforming reaction, catalyst particles may become deactivated as a result of mechanisms such as the deposition of coke on the particles; that is, after a period of time in use, the ability of catalyst particles to promote reforming reactions can decrease to the point that the catalyst is no longer useful. The catalyst must be reconditioned, or regenerated, before it can be reused in a reforming process.

In one preferred form, the reformer will employ a moving bed reaction zone and regeneration zone. Generally, fresh catalyst particles are fed to a reaction zone, which may be comprised of several subzones, and the particles flow through the zone by gravity-assisted transfer. In one exemplary embodiment, the reaction zone can include individual reactors with intermediate lifts between reactors. Catalyst may be withdrawn from the bottom of the reaction zone and transported to a regeneration zone where a multi-step regeneration process can be used to remove the coke deposits and recondition the catalyst to restore its reaction promoting ability. Generally, the regeneration zone contains oxygen and generally operates at about 370-about 538° C. (about 700-about 1000° F.). Typically, catalyst flows by gravity-assisted transfer through the various regeneration steps and then is withdrawn from the regeneration zone at temperatures usually no greater than about 200° C. (about 400° F.) and furnished to the reaction zone. Catalyst that is withdrawn from the regeneration zone can be termed regenerated catalyst. Movement of catalyst through the zones is often referred to as continuous though, in practice, it may be semi-continuous. Semi-continuous movement can mean the repeated transfer of relatively small amounts of catalyst at closely spaced points in time. As an example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system can have the advantage of maintaining production while the catalyst is removed or replaced.

Before referencing the drawing figures, a hydrocarbon conversion unit can include a reaction vessel and a regeneration vessel, along with the lines and equipment associated with these vessels as disclosed in, e.g., U.S. Pat. Nos. 6,881,391 B1 (Sechrist) and 6,034,018 (Sechrist et al.). Moreover, the one or more hydrocarbon conversion units described below may also include an apparatus for transferring catalyst, including a storage vessel, a catalyst transfer vessel, and optionally a receptacle vessel, and one or more lifts, differential pressure controllers, pressure-reduction vessels, nitrogen-containing vessels, reducing vessels, and elutriation vessels as disclosed in copending patent application entitled, "HYDROCARBON CONVERSION UNIT INCLUDING A REACTION ZONE RECEIVING TRANSFERRED CATALYST", filed Aug. 1, 2007, and assigned U.S. Ser. No. 11/832,008. So, the following units may be described schematically in the context of the present embodiments, generally not drawn to scale, and not arranged in a manner as typically utilized. The hydrocarbon flow through the reaction vessel and accompanying equipment, e.g. heat exchangers and furnaces, known to those of skill in the art are omitted, while the discussion below focuses on the flow of catalyst to and from the reaction zone and regeneration zone.

Referring to FIG. 1, a hydrocarbon conversion unit 100, such as a catalytic reforming unit, can include a regeneration vessel or regenerator 120, an apparatus 138 for transferring one or more particulate solids, such as catalyst, and a reaction vessel or reactor 200. In this exemplary embodiment, the apparatus 138 can include an upstream vessel 140, a transfer vessel 160, and a downstream vessel 180. Although in other exemplary embodiments, the apparatus 138 can include the transfer vessel 160, and optionally, the upstream vessel 140 and/or the downstream vessel 180. Generally, catalyst can be passed from one vessel to the next by gravity-assisted transfer or by utilizing a lift. Moreover, the vessels can be arranged in two or more substantially vertical stacks, as depicted in FIGS. 1-4 of copending patent application entitled, "HYDROCARBON CONVERSION UNIT INCLUDING A REACTION ZONE RECEIVING TRANSFERRED CATALYST", filed Aug. 1, 2007, and assigned U.S. Ser. No. 11/832,008.

The regeneration vessel 120 can receive spent catalyst from a lift 90 communicating with the reaction vessel 200. The catalyst can enter an inlet 124 and exit an outlet 128. Generally, the catalyst contained in the regeneration vessel 120 is at first pressure in an atmosphere having oxygen at a first zone 132.

The upstream vessel 140 can communicate with the regeneration vessel via a line by, e.g., gravity-assisted transfer or by a lift 136. The upstream vessel 140 can receive regenerated catalyst via an inlet 144 and catalyst can exit via an outlet 148. The upstream vessel 140 can be a storage vessel or an elutriation vessel, or can include a plurality of vessels such as a storage vessel, an elutriation vessel, and optionally a nitrogen-containing vessel. If the upstream vessel 140 includes a plurality of vessels, preferably the vessels are arranged so the storage vessel can receive catalyst via gravity-assisted transfer from the elutriation vessel. In one preferred embodiment, the plurality of vessels can include the elutriation vessel, the nitrogen-containing vessel and the storage vessel arranged in a stack where catalyst can be passed from the elutriation vessel, to the nitrogen-containing vessel, and then to the storage vessel by gravity-assisted transfer.

After exiting the outlet 148, the catalyst can pass through a line 156 to the transfer or catalyst transfer vessel 160. Generally, the catalyst transfer vessel 160 has an inlet 164 for receiving regenerated catalyst and an outlet 168 for passing the catalyst through a line 176. Usually, the catalyst transfer vessel 160 permits the transfer of catalyst from an atmosphere containing oxygen at a lower first pressure to an atmosphere containing hydrogen at a higher second pressure. The catalyst transfer vessel 160 can cycle to pass regenerated catalyst in batches and has a fill volume 172 for containing catalyst.

From the line 176, the catalyst can pass by gravity-assisted transfer to a downstream vessel 180. The catalyst can enter an inlet 184 and exit an outlet 188. The downstream vessel 180 can be a receptacle vessel, a reducing or reduction vessel, or can include a plurality of vessels such as a receptacle vessel and a reducing vessel. Afterwards, the catalyst can enter a lift or line 196. Generally, a lift is utilized if the downstream vessel 180 is a receptacle vessel that may release the catalyst in a controlled continuous manner to the lift and subsequently to a reactor. Generally, a line is utilized if the downstream vessel 180 is a reducing vessel positioned above a reactor, where the catalyst can be released in a controlled continuous manner to the reactor by gravity-assisted transfer.

In either event, the catalyst can next enter an inlet 204 of the reactor 200 for reforming a hydrocarbon stream. The reactor 200 may contain an atmosphere including hydrogen at a second pressure, generally at a second zone 212. Moreover, the reactor 200 can contain a plurality of reaction zones, such as three or four zones. As discussed above, the second pressure is typically higher than the first pressure associated with the regeneration vessel 120. Next, the spent catalyst may exit the reaction vessel 200 via an outlet 208 and into the lift 90 to repeat the cycle.

The hydrocarbon conversion unit 100 can include an exemplary catalyst regeneration control system 215, which in turn can include the first level indicator 220 and second level indicator 240, which both may be nuclear level indicators with a respective range of about 0-about 100%. Generally, the first level indicator 220 and the second level indicator 240 determine the actual level of catalyst in, respectively, the vessels 140 and 180. The level indicators 220 and 240 can communicate, respectively, with the vessels 140 and 180 with mechanical linkages or electro-optical sensors 228 and 248. Signals 224 and 244 can be sent, respectively, to vessels 120 and 160 to control the release of catalyst, as described below. In one preferred embodiment, the upstream vessel 140 may comprise an elutriation vessel, optionally a nitrogen-containing vessel, and a storage vessel, preferably with the linkage or sensor 228 measuring the level of the catalyst in the elutriation vessel.

Figure 2:
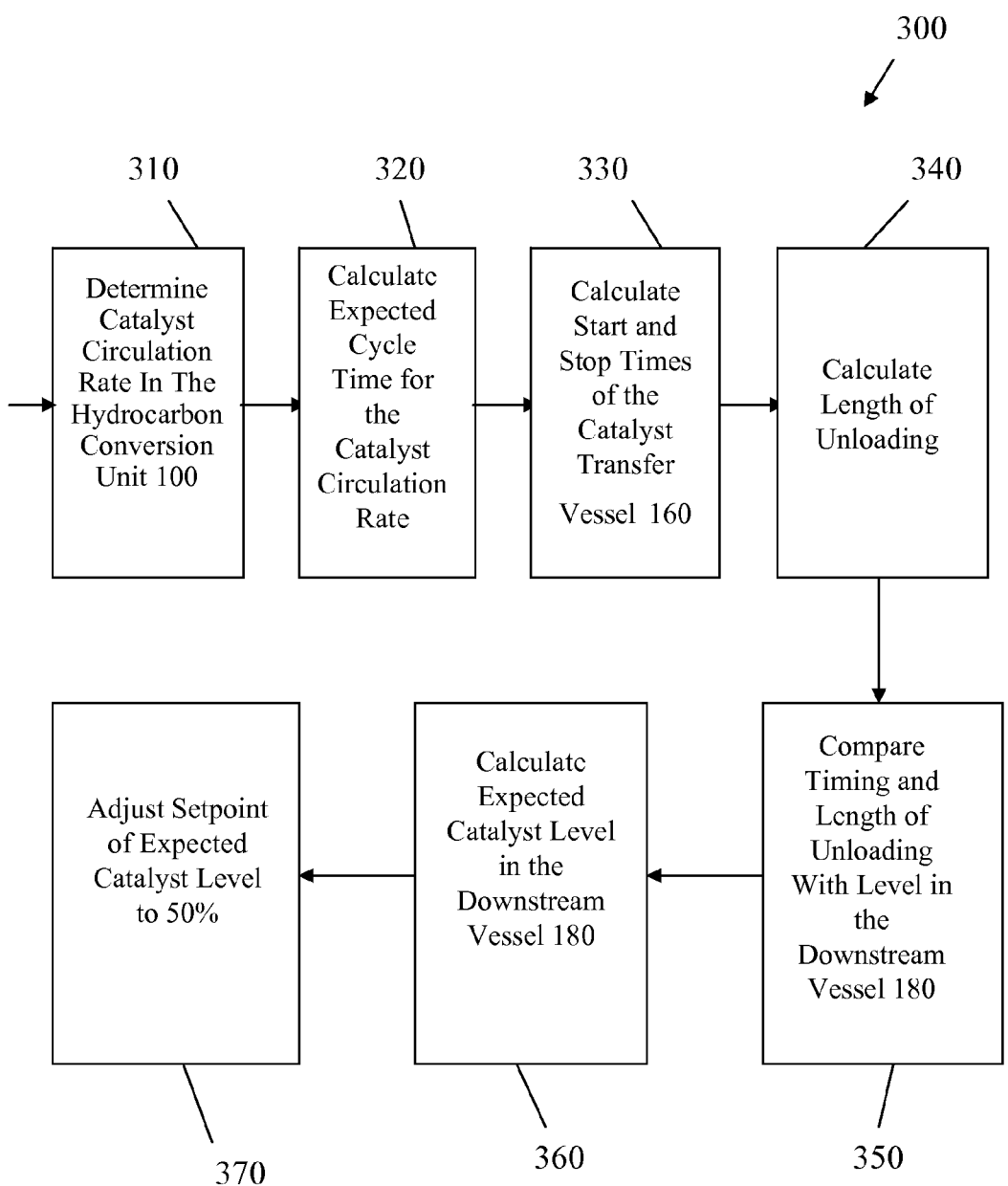
FIG. 2 is a schematic depiction of an exemplary mode of operation.

Referring to FIG. 2, an exemplary mode of operation 300 of the catalyst regeneration control system 215 is depicted. At a block 310, the catalyst circulation rate in the hydrocarbon conversion unit 100 can be determined. Next, the expected cycle time for the catalyst circulation rate may be calculated at a block 320. That being done, the start and stop times of the catalyst transfer vessel 160 can be calculated at a block 330, which can be based on the circulation rate and a fill volume of the catalyst transfer vessel 160. Subsequently, the length of unloading of the catalyst transfer vessel 160 can be calculated at a block 340. Afterwards at a block 350, the timing and length of unloading with level in the downstream vessel 180 can be compared. Subsequently, the expected catalyst level in the downstream vessel 180 can be calculated at a block 360, which can be based on the actual catalyst level in the downstream vessel 180, an expected time of delivery and an amount of catalyst from the catalyst transfer vessel 160, and a rate of catalyst exiting the downstream vessel 180. If desired, a setpoint based on the expected catalyst level in the downstream vessel 180 can be adjusted to 50% at a block 370. The setpoint can relate, e.g., to altering the circulation rate of the catalyst in the unit 100 and the subsequent transfer of catalyst from the catalyst transfer vessel 160. Thus, the cycling of the catalyst transfer vessel 160 is based on the expected level in the downstream vessel 180, rather than its actual level, to aid in providing a continuous catalyst flow in the hydrocarbon conversion unit 100.

In one preferred embodiment, the first level indicator 220 of the exemplary catalyst regeneration control system 215 may measure the level of catalyst in the stream vessel 140. When the first level indicator 220 gets a measurement of about 60%, a cycle of the transfer vessel 160 can be initiated. Subsequently, the level of catalyst in the upstream vessel 140 can drop and the transfer vessel 160 may not cycle again until the first level indicator 220 exceeds about 60%. Thus, the level in the upstream vessel 140 can initiate the cycling of the transfer vessel 160.

Due to the batch cycling of catalyst from the transfer vessel 160 into the downstream vessel 180, the level of the downstream vessel 180 may also cycle. Control of catalyst from the downstream vessel 180 may be accomplished by calculating the expected catalyst level, as discussed above. Therefore, the catalyst regeneration control system 215 can accurately predict the level in the downstream catalyst vessel 180 at any time in the cycle in order to achieve an average level of about 50% of the maximum level. Desirably, the actual level should be compared to the calculated expected catalyst level as opposed to simply comparing against a fixed set point of 50% for the purposes of level control.

In this embodiment, the transfer vessel 160 cycle can be initiated by the level in the downstream vessel 180, instead of the level in the transfer vessel 160. In such an instance, the catalyst circulation rate in the unit 100 can be increased or decreased to adjust the rate of the transfer vessel 160 cycling, and hence the catalyst level in the vessel 180. This control system 215 can ensure a continuous flow of catalyst through the unit 100.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth uncorrected in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method of controlling a catalyst transfer vessel cycle of loading and unloading based on an expected level of a catalyst in a downstream vessel for a hydrocarbon conversion unit, comprising:
   a) calculating an expected catalyst level in the downstream vessel based on the actual catalyst level in the downstream vessel, an expected time of delivery and an amount of catalyst from the catalyst transfer vessel, and a rate of catalyst exiting the downstream vessel; and
   b) adjusting a setpoint for the catalyst circulation rate based on the expected catalyst level of the downstream vessel.

2. The method according to claim 1, further comprising determining a catalyst circulation rate in the hydrocarbon conversion unit before calculating the expected catalyst level.

3. The method according to claim 2, further comprising calculating an expected cycle time of the catalyst in the hydrocarbon conversion unit based on the catalyst circulation rate.

4. The method according to claim 3, further comprising calculating a start time and a stop time of unloading the catalyst from the catalyst transfer vessel based on the catalyst circulation rate and a fill volume of the catalyst transfer vessel.

5. The method according to claim 4, further comprising calculating a time length for unloading the catalyst transfer vessel based on the start and stop times of unloading.

6. The method according to claim 5, further comprising comparing the time for unloading with an actual level of catalyst in the downstream vessel.

7. A method of controlling a catalyst transfer vessel cycle of loading and unloading based on an expected level of a catalyst in a downstream vessel for a hydrocarbon conversion unit, comprising:
   a) determining a catalyst circulation rate in the hydrocarbon conversion unit;
   b) calculating an expected cycle time of the catalyst in the hydrocarbon conversion unit based on the catalyst circulation rate;
   c) calculating a start time and a stop time of unloading the catalyst from the catalyst transfer vessel based on the catalyst circulation rate and a fill volume of the catalyst transfer vessel;
   d) calculating a time length for unloading the catalyst transfer vessel based on the start and stop times of unloading;
   e) comparing the time for unloading with an actual level of catalyst in the downstream vessel;
   f) calculating the expected catalyst level in the downstream vessel based on the actual catalyst level in the downstream vessel, an expected time of delivery and an amount of catalyst from the catalyst transfer vessel, and a rate of catalyst exiting the downstream vessel; and
   g) adjusting a setpoint for the catalyst circulation rate based on the expected catalyst level of the downstream vessel.

8. A hydrocarbon conversion unit, comprising:
   a) an apparatus for transferring one or more particulate solids, wherein the apparatus comprises:

i) a transfer vessel for transferring particulate solids from a zone at a first pressure to a zone at a second pressure;
ii) a downstream vessel; wherein the downstream vessel receives the one or more particulate solids; and
iii) a level indicator controller communicating with the downstream vessel and the transfer vessel wherein the level indicator controller measures the level of particulate solids in the downstream vessel and calculates an expected catalyst level in the downstream vessel based on the actual catalyst level in the downstream vessel, an expected time of delivery and an amount of catalyst from the catalyst transfer vessel and a rate of catalyst exiting the downstream vessel, and adjusts a setpoint for the catalyst circulation rate based on the expected catalyst level of the downstream vessel.

9. The hydrocarbon conversion unit according to claim 8, wherein the one or more particulate solids comprise regenerated catalyst.

10. The hydrocarbon conversion unit according to claim 8, further comprising a vessel upstream of the transfer vessel.

11. The hydrocarbon conversion unit according to claim 10, wherein the upstream vessel receives regenerated catalyst from a regeneration vessel.

12. The hydrocarbon conversion unit according to claim 10, further comprising a level indicator controller for the upstream vessel communicating with the regeneration vessel.

13. The hydrocarbon conversion unit according to claim 10, wherein the upstream vessel comprises an elutriation vessel.

14. The hydrocarbon conversion unit according to claim 10, wherein the upstream vessel comprises a storage vessel.

15. The hydrocarbon conversion unit according to claim 8, wherein the downstream vessel comprises a receptacle vessel.

16. The hydrocarbon conversion unit according to claim 15, wherein the receptacle vessel communicates with a lift.

17. The hydrocarbon conversion unit according to claim 8, wherein the downstream vessel comprises a reducing vessel.

18. The hydrocarbon conversion unit according to claim 17, further comprising a reaction vessel communicating with an outlet of the reducing vessel.

19. The hydrocarbon conversion unit according to claim 8, wherein the hydrocarbon conversion unit comprises a catalytic reforming unit.

* * * * *